US008071695B2

(12) United States Patent
Strand et al.

(10) Patent No.: US 8,071,695 B2
(45) Date of Patent: Dec. 6, 2011

(54) POLYESTE BLENDS WITH IMPROVED STRESS WHITENING FOR FILM AND SHEET APPLICATIONS

(75) Inventors: Marc Alan Strand, Kingsport, TN (US); Rodney Layne Piner, Kingsport, TN (US); David Gayle Salyer, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 1168 days.

(21) Appl. No.: 11/270,976

(22) Filed: Nov. 10, 2005

(65) Prior Publication Data
US 2006/0111519 A1 May 25, 2006

Related U.S. Application Data

(60) Provisional application No. 60/627,754, filed on Nov. 12, 2004.

(51) Int. Cl.
*C08G 63/00* (2006.01)
(52) U.S. Cl. ......................... 525/444; 525/437; 528/302
(58) Field of Classification Search .................. 525/444, 525/437; 528/302
See application file for complete search history.

(56) References Cited

U.S. PATENT DOCUMENTS

| | | |
|---|---|---|
| 2,012,267 A | 8/1935 | Carothers |
| 2,044,612 A | 6/1936 | Jaeger |
| 3,186,961 A | 6/1965 | Sears |
| 3,632,306 A | 1/1972 | Villiers-Fisher |
| 3,658,978 A | 4/1972 | Ancker |
| 3,873,496 A | 3/1975 | Hills |
| 3,883,478 A | 5/1975 | Gresham |
| 4,045,431 A | 8/1977 | Fagerburg |
| 4,258,153 A | 3/1981 | Yomamoto et al. |
| 4,340,526 A | 7/1982 | Petke et al. |
| 4,356,282 A | 10/1982 | Largman |
| 4,369,246 A | 1/1983 | Chen et al. |
| 4,379,801 A | 4/1983 | Weaver et al. |
| 4,391,938 A | 7/1983 | Memon et al. |
| 4,450,250 A | 5/1984 | McConnell et al. |
| 4,506,043 A | 3/1985 | Ogawa et al. |
| 4,524,165 A * | 6/1985 | Musser et al. ................. 524/99 |
| 4,524,191 A | 6/1985 | Nakamura et al. |
| 4,558,085 A | 12/1985 | Lee |
| 4,681,723 A | 7/1987 | Jester |
| 4,814,426 A | 3/1989 | Utsumi et al. |
| 4,837,254 A | 6/1989 | Branscome |
| 4,873,270 A | 10/1989 | Aime et al. |
| 4,963,418 A | 10/1990 | Isaka et al. |
| 4,996,291 A | 2/1991 | Yoshinaka et al. |
| 5,017,680 A | 5/1991 | Sublett |
| 5,115,004 A * | 5/1992 | Mochizuki et al. ........... 524/107 |
| 5,124,198 A | 6/1992 | Koskenmaki et al. |
| 5,256,714 A | 10/1993 | Liu et al. |
| 5,290,631 A | 3/1994 | Fleury et al. |
| 5,292,548 A | 3/1994 | Rainwater |
| 5,322,663 A | 6/1994 | Lai et al. |
| 5,399,595 A | 3/1995 | Sublett et al. |
| 5,399,661 A | 3/1995 | Borman |
| 5,446,079 A | 8/1995 | Buchanan et al. |
| 5,484,632 A | 1/1996 | Mercer, Jr. et al. |
| 5,489,470 A | 2/1996 | Noda |
| 5,498,692 A | 3/1996 | Noda |
| 5,502,116 A | 3/1996 | Noda |
| 5,532,049 A | 7/1996 | Masuda et al. |
| 5,534,570 A | 7/1996 | Shih et al. |
| 5,536,564 A | 7/1996 | Noda |
| 5,589,126 A | 12/1996 | Shih et al. |
| 5,602,227 A | 2/1997 | Noda |
| 5,618,855 A | 4/1997 | Noda |
| 5,624,987 A | 4/1997 | Brink et al. |
| 5,654,347 A | 8/1997 | Khemani et al. |
| 5,679,288 A | 10/1997 | Kim et al. |
| 5,695,698 A | 12/1997 | Ajji et al. |
| 5,696,176 A | 12/1997 | Khemani et al. |
| 5,703,160 A | 12/1997 | Dehennau et al. |
| 5,709,929 A | 1/1998 | Venema |
| 5,750,605 A | 5/1998 | Blumenthal et al. |
| 5,753,782 A | 5/1998 | Hammond et al. |
| 5,766,277 A | 6/1998 | DeVoe et al. |
| 5,773,554 A | 6/1998 | Dickerson et al. |

(Continued)

FOREIGN PATENT DOCUMENTS

CN 1607083 9/2005

(Continued)

OTHER PUBLICATIONS

U.S. Appl. No. 10/706,669, filed Nov. 12, 2003, Strand et al.
U.S. Appl. No. 10/722,870, filed Nov. 26, 2003, Strand et al.
Database WPI, Section CH, Week 9702, XP-002106151, Derwent Publications, Ltd., Oct. 29, 1996, London, GB.
Jim Butschli, Packaging World, pp. 26-28, Jun. 1997.
W.V. Titow, PVC Technology, 4th Edition, pp. 803-848 (1984), Elsevier Publishing Co.
Material Safety Data Sheet, "EASTAR" Copolyester 6763, Aug. 13, 2002.
Anonymous Research Disclosure 23314, Sep. 1983.
Fox equation, T.G. Fox, Bull. Am. Phys. Soc., 1, 123 (1956).

(Continued)

*Primary Examiner* — Alicia Toscano
(74) *Attorney, Agent, or Firm* — Louis N. Moreno; Bernard J. Graves, Jr.

(57) ABSTRACT

Disclosed are polyester blends that provide improved stress whitening behavior. The blends may be prepared from a polyester having crystallization half-time of at least 5 minutes and a polyester elastomer. The polyesters blends may be extruded or, in the presence of a release additive, calendered to produce film or sheet. Also disclosed are processes for making a film or sheet by extrusion or calendering the above blends and the film or sheet produced therefrom. The polyester blend and the film or sheet produced therefrom also may include plasticizers and/or flame retardants to increase their flexibility and enable their use in commercial applications requiring flame resistance. The film and sheet have excellent appearance and can be used in a wide range of decorative and packaging applications.

16 Claims, No Drawings

U.S. PATENT DOCUMENTS

| | | | |
|---|---|---|---|
| 5,817,721 A | 10/1998 | Warzelhan et al. | |
| 5,824,398 A | 10/1998 | Shih | |
| 5,859,116 A | 1/1999 | Shih | |
| 5,897,910 A | 4/1999 | Rosenberg et al. | |
| 5,900,322 A | 5/1999 | Buchanan et al. | |
| 5,928,788 A | 7/1999 | Riedl | |
| 5,958,581 A | 9/1999 | Khanarian et al. | |
| 5,965,648 A | 10/1999 | Brink et al. | |
| 5,991,047 A | 11/1999 | Kohlert et al. | |
| 5,998,005 A | 12/1999 | Kanno | |
| RE36,548 E | 2/2000 | Noda | |
| 6,025,061 A | 2/2000 | Khanarian et al. | |
| 6,054,551 A | 4/2000 | Cornell et al. | |
| 6,068,910 A | 5/2000 | Flynn et al. | |
| 6,077,931 A | 6/2000 | Noda | |
| 6,103,857 A | 8/2000 | Jones et al. | |
| 6,114,431 A | 9/2000 | Lee et al. | |
| 6,127,512 A | 10/2000 | Asrar et al. | |
| 6,160,199 A | 12/2000 | Noda | |
| 6,174,990 B1 | 1/2001 | Noda | |
| 6,204,313 B1 | 3/2001 | Bastiaens et al. | |
| 6,231,970 B1 | 5/2001 | Anderson et al. | |
| 6,303,677 B1 | 10/2001 | Warzelhan et al. | |
| 6,326,435 B1 | 12/2001 | Takayama et al. | |
| 6,350,530 B1 | 2/2002 | Morikawa et al. | |
| 6,482,872 B2 | 11/2002 | Downie | |
| 6,538,054 B1 | 3/2003 | Klatt et al. | |
| 6,551,688 B2 | 4/2003 | Moskala et al. | |
| 6,551,699 B1 | 4/2003 | Flynn | |
| 6,565,787 B1 | 5/2003 | Sarver et al. | |
| 6,569,990 B1 | 5/2003 | Noda | |
| 6,620,869 B2 | 9/2003 | Asrar et al. | |
| 6,632,390 B1 | 10/2003 | Shelby et al. | |
| 6,787,245 B1 | 9/2004 | Hayes | |
| 6,846,440 B2 | 1/2005 | Flynn et al. | |
| 7,030,181 B2 | 4/2006 | Moskala et al. | |
| 2001/0027225 A1 | 10/2001 | Downie | |
| 2002/0004578 A1 | 1/2002 | Shelby et al. | |
| 2002/0061944 A1 | 5/2002 | Asrar et al. | |
| 2002/0188092 A1* | 12/2002 | Moskala et al. | 528/272 |
| 2002/0192891 A1 | 12/2002 | Takata et al. | |
| 2003/0060542 A1 | 3/2003 | Witt et al. | |
| 2003/0060546 A1 | 3/2003 | Moskala et al. | |
| 2003/0065075 A1 | 4/2003 | Flynn et al. | |
| 2003/0127179 A1 | 7/2003 | Pasti | |
| 2003/0145518 A1 | 8/2003 | Noda et al. | |
| 2003/0171471 A1 | 9/2003 | Pritschins et al. | |
| 2003/0187149 A1 | 10/2003 | Schmidt et al. | |
| 2003/0209313 A1 | 11/2003 | Stoll | |
| 2003/0212244 A1 | 11/2003 | Hayes et al. | |
| 2004/0024101 A1 | 2/2004 | Hayes | |
| 2004/0024102 A1 | 2/2004 | Hayes et al. | |
| 2004/0039092 A1 | 2/2004 | Asrar et al. | |
| 2004/0068059 A1 | 4/2004 | Katayama et al. | |
| 2004/0127609 A1 | 7/2004 | Strand et al. | |
| 2004/0142194 A1 | 7/2004 | Peiffer et al. | |
| 2004/0152810 A1 | 8/2004 | Takenaka et al. | |
| 2004/0154734 A1 | 8/2004 | Akada et al. | |
| 2005/0008884 A1 | 1/2005 | Kappacher et al. | |
| 2005/0096453 A1 | 5/2005 | Flynn et al. | |
| 2005/0096456 A1 | 5/2005 | Betley | |
| 2005/0113556 A1 | 5/2005 | Strand et al. | |
| 2005/0119359 A1 | 6/2005 | Shelby et al. | |
| 2005/0136271 A1 | 6/2005 | Germroth et al. | |
| 2005/0137304 A1 | 6/2005 | Strand et al. | |
| 2005/0275122 A1 | 12/2005 | Benson et al. | |
| 2006/0041056 A1 | 2/2006 | Sunagawa et al. | |

FOREIGN PATENT DOCUMENTS

| | | |
|---|---|---|
| DE | 100 40 691 A1 | 2/2002 |
| EP | 0 724 947 A1 | 8/1996 |
| EP | 0 744 439 A1 | 11/1996 |
| EP | 0 484 818 | 1/1997 |
| EP | 0759350 | 2/1997 |
| EP | 0 965 615 A1 | 12/1999 |
| EP | 1 054 038 A1 | 11/2000 |
| EP | 1153722 | 11/2001 |
| EP | 1 375 556 A2 | 2/2004 |
| EP | 1 529 808 A2 | 5/2005 |
| EP | 1 529 809 A1 | 5/2005 |
| GB | 805 586 A | 12/1958 |
| GB | 805 587 | 12/1958 |
| GB | 805 588 A | 12/1958 |
| GB | 815 991 | 7/1959 |
| GB | 1 323 478 | 9/1973 |
| JP | 62115058 | 11/1985 |
| JP | 63054460 | 8/1986 |
| JP | 1-138260 A | 5/1989 |
| JP | 1-49741 B2 | 10/1989 |
| JP | 8-142290 A | 11/1990 |
| JP | 10-291225 A | 11/1990 |
| JP | 4-62144 | 2/1992 |
| JP | 4-117432 | 4/1992 |
| JP | 4-166309 | 6/1992 |
| JP | 5-271397 A | 10/1993 |
| JP | 7-60924 A | 3/1995 |
| JP | 7-278418 A | 10/1995 |
| JP | 8192463 | 7/1996 |
| JP | 8-283547 A | 10/1996 |
| JP | 3582887 | 10/1996 |
| JP | 9-40823 A | 2/1997 |
| JP | 9-66590 A2 | 3/1997 |
| JP | 9-217014 | 8/1997 |
| JP | 9-272191 A | 10/1997 |
| JP | 11-158358 A | 6/1999 |
| JP | 2-986197 | 10/1999 |
| JP | 11-343353 A | 12/1999 |
| JP | 2000-136294 A | 5/2000 |
| JP | 2000-302951 A | 10/2000 |
| JP | 2000-319489 | 11/2000 |
| JP | 2000-327891 | 11/2000 |
| JP | 2000-336256 A | 12/2000 |
| JP | 2001-18344 A | 1/2001 |
| JP | 2001-40197 | 2/2001 |
| JP | 2001-139744 | 5/2001 |
| JP | 2001-214044 A | 8/2001 |
| JP | 2001-279068 A | 10/2001 |
| JP | 2001-302833 A | 10/2001 |
| JP | 2001-354842 A | 12/2001 |
| JP | 2002-53740 A | 2/2002 |
| JP | 2002-53741 | 2/2002 |
| JP | 2002-053742 | 2/2002 |
| JP | 2002-121362 A | 4/2002 |
| JP | 2002-129002 A | 5/2002 |
| JP | 2002-129483 A | 5/2002 |
| JP | 2000-186191 A | 7/2002 |
| JP | 10363908 | 7/2002 |
| JP | 2002-275217 A | 9/2002 |
| JP | 2002-294043 A | 10/2002 |
| JP | 2003-02951 | 1/2003 |
| JP | 2003-20386 A | 1/2003 |
| JP | 2003-128773 A | 5/2003 |
| JP | 2003-128889 A | 5/2003 |
| JP | 2003-128890 A | 5/2003 |
| JP | 2003-128894 A | 5/2003 |
| JP | 2003-154539 A | 5/2003 |
| JP | 2003-155401 A | 5/2003 |
| JP | 2003-155402 A | 5/2003 |
| JP | 2003-171537 A | 6/2003 |
| JP | 2003-191266 A | 7/2003 |
| JP | 2003-201391 A | 7/2003 |
| JP | 2003-231796 | 8/2003 |
| JP | 2003-231820 | 8/2003 |
| JP | 2003-277592 A | 10/2003 |
| JP | 2001-64496 A | 3/2004 |
| JP | 2004-143353 A | 5/2004 |
| JP | 2001-200146 A | 7/2004 |
| JP | 2004-182759 A | 7/2004 |
| JP | 2004-238534 A | 8/2004 |
| JP | 2004-345218 | 12/2004 |
| JP | 2005-8771 A | 1/2005 |
| JP | 2005-132107 | 5/2005 |
| JP | 2005-139283 | 6/2005 |
| JP | 2005-154507 | 6/2005 |
| JP | 2005-187779 | 7/2005 |
| JP | 2005-213398 | 8/2005 |

| | | |
|---|---|---|
| JP | 2005-275122 | 10/2005 |
| JP | 2005-298660 | 10/2005 |
| WO | WO 87/03291 A | 6/1987 |
| WO | WO 94/28061 A1 | 12/1994 |
| WO | WO 95/14734 | 6/1995 |
| WO | WO 95/20614 | 8/1995 |
| WO | WO 97/10302 | 3/1997 |
| WO | WO 97/42260 | 11/1997 |
| WO | WO 97/49757 A | 12/1997 |
| WO | WO 99/23146 | 5/1999 |
| WO | WO 99/47605 A | 9/1999 |
| WO | WO 00/37544 A1 | 6/2000 |
| WO | WO 01/85451 A1 | 11/2001 |
| WO | WO 02/28967 A1 | 4/2002 |
| WO | WO 02/072333 | 9/2002 |
| WO | WO 2004/029147 A1 | 4/2004 |
| WO | WO 2004/039887 | 5/2004 |
| WO | WO 2004-060990 A2 | 7/2004 |
| WO | WO 2005/063887 | 7/2005 |
| WO | WO 2005/092982 | 10/2005 |
| WO | WO 2006/003348 | 1/2006 |

OTHER PUBLICATIONS

"The Technology of Plasticizers", by J. Kern Sears and Joseph R. Darby, published by Society of Plastic Engineers/Wiley and sons, New York, 1982, pp. 134-137.

Coleman et al., Polymer 31, (1990), 1187-1203.

Elias, H. *Macromolecules*, Plenum Press: NY, 1977, p. 390-394.

Office Action dated Oct. 1, 2004 for U.S. Appl. No. 10/722,870, filed Nov. 26, 2003.

Office Action dated Feb. 3, 2005 for U.S. Appl. No. 10/086,905, filed Feb. 28, 2002.

Office Action dated Jun. 22, 2005, for U.S. Appl. No. 10/706,669, filed Nov. 2, 2003.

International Search Report dated Apr. 27, 2005, for PCT/US2004/041638.

International Search Report dated Apr. 27, 2005 for PCT/US2004/041737.

Office action dated Jun. 1, 2005 for U.S. Appl. No. 10/086,905, filed Feb. 28, 2002.

Mixing and Compounding of Polymers; Theory and Practice; I. Manas-Azloczower and Z. Tadmor editors; 1994, Chapters 18-23 pp. 619-830; Carl Hansler Verlag Publisher, New York, NY.

Office Action dated Jun. 9, 2005, for U.S. Appl. No. 10/722,870, filed Nov. 26, 2003.

John Davis, Plastics Additives: An A-Z Reference, Flame retardants: halogen-free systems (including phosphorus additives), 1998, pp. 277-286, Chapman and Hall, London.

International Search Report, PCT/US2005/040961 dated Apr. 18, 2006.

Catia Bastioli, Starch-polymer composites, Degradable Polymers, 1995, pp. 112-137, Chapman and Hall, London.

Copending U.S. Appl. No. 11/005,352, filed Dec. 6, 2004.

Copending U.S. Appl. No. 10/722,870, filed Nov. 26, 2003.

Copending U.S. Appl. No. 10/706,669, filed Nov. 12, 2003.

Copending U.S. Appl. No. 10/086,905, filed Feb. 28, 2002.

Copending U.S. Appl. No. 11/005,167, filed Dec. 6, 2004.

International Search Report dated Feb. 24, 2005 for PCT/US2004/038419.

International Search Report dated Jul. 16, 2002 for PCT/US2002/10316.

International Search Report dated Sep. 7, 2004 for PCT/US2003/30314.

* cited by examiner

US 8,071,695 B2

POLYESTE BLENDS WITH IMPROVED STRESS WHITENING FOR FILM AND SHEET APPLICATIONS

CROSS-REFERENCE TO RELATED APPLICATIONS

This application claims the benefit of U.S. Provisional Patent Application No. 60/627,754, filed on Nov. 12, 2004; the entire content of which is hereby incorporated by reference.

FIELD OF THE INVENTION

This invention pertains to polyester blends for extrusion and/or calendering and, more specifically, to polyester blends which enable improved stress whitening behavior. The invention further pertains to extrusion and/or calendering processes for these polyester blends and to polyester film or sheet produced therefrom.

BACKGROUND OF THE INVENTION

Film and sheet products are often stressed and cold formed during the assembly process in many applications. For example, in some appliance applications, opaque and colored films are often laminated to metal in place of paint. In this case, the polymer film is laminated to the metal in a flat form. The metal with the polymer film lamination is then bent or pressed into shape to form appliance housings for washers, dryers, refrigerators, and the like. During this cold forming process, some polymer film formulations tend to whiten as they are bent and stretched into shape and cause unattractive white streaks to appear in the finish of the appliance. This problem is more pronounced with darker colors. Stress whitening behavior is usually determined visually. A film is usually stretched to 50% or 100% elongation and examined for color changes. Flexible film and sheet products that do not exhibit stress whitening properties are therefore highly desirable for many applications.

Calendering is an economic and highly efficient method to produce film and sheet from plastics such as plasticized and rigid poly(vinyl chloride), abbreviated herein as "PVC", and polypropylene compositions. The film and sheet usually have a thickness ranging from about 1 mil (0.025 mm) to about 80 mils (2.0 mm). Calendered PVC films or sheets are readily thermoformed into various shapes, which can be used in a wide range of applications including packaging, pool liners, graphic arts, transaction cards, security cards, veneers, wall coverings, book bindings, folders, floor tiles, and products that are printed, decorated, or laminated in a secondary operation. Additional discussion on polypropylene resin compositions used in calendering processes may be found in Japanese Patent Application No. Hei 9-40823 and European Patent Application No. 0 744 439 A1.

By contrast, conventional processing of polyesters into film or sheet involves extruding a polyester melt through a manifold of a flat die. Manual or automatic die lip adjustment is used to control thickness across a web of material. Water-cooled chill rolls are used to quench the molten web and impart a smooth surface finish.

PVC compositions are, by far, the largest segment of the calendered film and sheet business. Small amounts of other thermoplastic polymers such as, for example, thermoplastic rubbers, certain polyurethanes, talc-filled polypropylene, acrylonitrile/butadiene/styrene terpolymers (ABS resins), and chlorinated polyethylene, are sometimes processed by calendering methods. By contrast, polyester polymers such as, for example, poly(ethylene terephthalate), abbreviated herein as "PET", or poly(1,4-butylene terephthalate), abbreviated herein as "PBT", are difficult to calender successfully. For example, PET polymers with inherent viscosity values of about 0.6 deciliters/gram (abbreviated herein as "dL/g"), typically have insufficient melt strength to perform properly on the calendering rolls. Melt strength is defined as the ability of a polymer to support its weight in the molten state. In calendering, melt strength is related to the ability to remove the film from the roll process without deformation. For example, when calendered, a polymer with low melt strength will quickly sag and hit the floor; whereas, a polymer with high melt strength will maintain its shape for a much longer amount of time and can be further processed. Melt strength is thus important to minimize the amount of "drawdown" and gravity-induced sagging the polymer experiences during the calendering process. Drawdown is defined in calendering as the amount of thickness reduction between the calendering rolls and the take-up system and is expressed as the ratio of the nominal thickness or width dimension as the film exits the calendering rolls with the same dimension at the take-up roles.

PET and other polyester polymers also are prone to crystallize at typical processing temperatures of 160° C. to 180° C., resulting in a non-homogeneous mass which also causes high forces on the calender bearings. Increasing processing temperatures will reduce melt viscosity and improve processability. Higher temperatures, however, can cause degradation of the polyester such as, for example, by thermal degradation, hydrolysis of polymer by exposure to atmospheric moisture, and the formation of color bodies. Typical PET polymers also have a tendency to stick to the calendering rolls at higher processing temperatures. The calendering of various polyester compositions and several approaches to these problems has been described, for example, in U.S. Pat. Nos. 5,998,005; 6,068,910; 6,551,688; U.S. patent application Ser. No. 10/086,905; Japanese Patent Application Nos. 8-283547; 7-278418; 2002-53740; 10-363-908; 2002-121362; 2003-128894; 11-158358; and WO 02/28967. Although some of these difficulties can be avoided by the careful selection of polymer properties, additives, and processing conditions, calendering of polyesters at high rates of production is difficult.

The above shortcomings of the art illustrate the need for film or sheet products that may be produced by extrusion or by calendering and that do not exhibit stress whitening. These products would have applications as wood and metal laminates, graphic arts, transaction cards, security cards, veneers, wall coverings, book bindings, folders and the like.

SUMMARY OF THE INVENTION

We have surprisingly discovered that polyester blends comprising a polyester and a polyester elastomer may be calendered or extruded to form a film or sheet which exhibit improved stress whitening properties. Accordingly, the present invention provides a polyester blend, comprising:

(a) a polyester, wherein the polyester is a random copolymer having a crystallization half-time from a molten state of at least 5 minutes;

(b) one or more polyester elastomers; and (c) optionally, a release additive in an amount effective to prevent sticking of the polyester blend to calendering rolls.

The polyester blend of the present invention may be calendered or extruded to produce a film or sheet having excellent stress whitening properties, good surface properties, toughness, and flexibility. The blend of the invention may include other additives such as, for example, plasticizers, flame retardants, antioxidants, antiblocking agents, fillers, colorants, and pigments. The polyester may be any amorphous or substantially amorphous polyester having a crystallization half-time from the molten state of at least 5 minutes. The polyester typically will comprise at least 80 mole percent of the residues of terephthalic acid based on the total moles of diacid residues. The polyester elastomer may comprise any random or block copolyester that exhibits elastomeric properties. Representative examples of polyester elastomers include, but are not limited to, random or block poly(ether ester) polymers comprising polyester segments and polyether segments having molecular weights of 400 to 12,000, and aromatic-aliphatic polyesters.

The invention also provides a polyester blend comprising:
(a) about 5 to about 95 weight percent, based on the total weight of the blend, of a polyester having a crystallization half-time from a molten state of at least 5 minutes in which the polyester is a random copolymer comprising:
  (i) diacid residues comprising at least 80 mole percent, based on the total moles of diacid residues, of one or more residues of terephthalic acid, naphthalenedicarboxylic acid, 1,4-cyclohexanedicarboxylic acid, or isophthalic acid; and
  (ii) diol residues comprising about 10 to about 100 mole percent, based on the total moles of diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol;
(b) about 5 to about 95 weight percent, based on the total weight of the blend, of one or more polyester elastomers comprising:
  (i) diacid residues comprising the residues of one or more diacids selected from the group consisting of substituted or unsubstituted, linear or branched aliphatic dicarboxylic acids containing 2 to 20 carbon atoms, substituted or unsubstituted, linear or branched cycloaliphatic dicarboxylic acids containing 5 to 20 carbon atoms, and substituted or unsubstituted aromatic dicarboxylic acids containing 6 to 20 carbon atoms; and
  (ii) diol residues comprising the residues of one or more substituted or unsubstituted, linear or branched, diols selected from the group consisting of aliphatic diols containing 2 to 20 carbon atoms, poly(oxyalkylene)glycols and copoly(oxyalkylene)glycols of molecular weight of about 400 to about 12000, cycloaliphatic diols containing 5 to 20 carbon atoms, and aromatic diols containing 6 to 20 carbon atoms; and
(c) optionally, a release additive in an amount effective to prevent sticking of the polyester blend to calendering rolls.

The invention further provides a polyester blend comprising:
(a) a polyester, wherein the polyester is a random copolymer having a crystallization half-time from a molten state of at least 5 minutes;
(b) one or more polyester elastomers comprising:
  (i) diacid residues comprising the residues of one or more substituted or unsubstituted cycloaliphatic dicarboxylic acids containing 5 to 20 carbon atoms; and
  (ii) diol residues comprising the residues of one or more substituted or unsubstituted, linear or branched, diols selected from the group consisting of aliphatic diols containing 2 to 20 carbon atoms, poly(oxyalkylene)glycols and copoly(oxyalkylene)glycols of molecular weight of about 400 to about 12000, cycloaliphatic diols containing 5 to 20 carbon atoms, and aromatic diols containing 6 to 20 carbon atoms; and
(c) optionally, a release additive in an amount effective to prevent sticking of the polyester blend to calendering rolls.

In addition, the present invention provides a process for preparing a film or sheet comprising extruding or calendering the polyester blends of the invention.

The present invention also provides a polyester film or sheet produced by the extrusion or calendering processes described herein.

The polyester blends, films, and sheets of the invention may also include plasticizers and/or flame retardants to increase their flexibility and enable their use in commercial applications requiring flame resistance. The films or sheets have an excellent appearance, flexibility, and flame retardancy and can be used in a great variety of decorative and packaging applications. The films or sheets are readily thermoformed into various shapes for specific packaging applications for both food and non-food products. They may be printed with a wide variety of inks and may be laminated either in-line or off-line with fabrics or other plastic film or sheet. Some specific end uses include graphic arts, transaction cards, security cards, veneers, wall coverings, book bindings, folders and the like.

DETAILED DESCRIPTION

In one embodiment, the present invention provides a polyester blend comprising:
(a) a polyester, wherein the polyester is a random copolymer having a crystallization half-time from a molten state of at least 5 minutes;
(b) one or more polyester elastomers; and
(c) optionally, a release additive in an amount effective to prevent sticking of the polyester blend to calendering rolls.

The polyester blend of the present invention may be calendered or extruded to produce a film or sheet having excellent stress whitening properties, good surface properties, toughness, and flexibility. The polyester blend may also comprise one or more plasticizers to increase the flexibility and softness of calendared polyester film, improve the processing of the polyester, and help to prevent sticking of the polyester to the calender rolls. The invention also provides a process for making a film or sheet by calendering the novel polyester blends and for the film or sheet produced from such calendering processes. The calendered film or sheet typically have a thickness in the range of about 1 mils (0.05 mm) to about 80 mils (2 mm).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose C, and $C_5$ hydrocarbons as well as $C_2$, $C_3$, and $C_4$ hydrocarbons.

The numerical ranges and parameters used to describe the invention are approximations. Nonetheless, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically, the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus, bearing 2 hydroxyl substituents such as, for example, hydroquinone.

The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyester blends of present invention are prepared from polyesters comprising dicarboxylic acid residues, diol residues, and, optionally, branching monomer residues. The polyesters of the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % ethylene glycol, based on the total diol residues, means the polyester contains 30 mole % ethylene glycol residues out of a total of 100 mole % diol residues. Thus, there are 30 moles of ethylene glycol residues among every 100 moles of diol residues.

The polyesters of this invention have a crystallization half-time from a molten state of at least 5 minutes. The crystallization half-time may be, for example, at least 7 minutes, at least 10 minutes, at least 12 minutes, at least 20 minutes, and at least 30 minutes. Typically, polyesters exhibiting a crystallization half-time of at least 5 minutes are copolyesters or random copolymers. The term "random copolymer", as used herein, means that the polyester comprises more than one diol and/or diacid residues in which the different diol or diacid residues are randomly distributed along the polymer chain. Thus, the term "random copolymers" as used in the context of the polyesters of the instant invention, means that the polyesters are not "homopolymers" or "block copolymers" as would be understood by persons of skill in the art. Preferably, the polyesters which are random copolymers have a substantially amorphous morphology, meaning that the polyesters comprise substantially unordered regions of polymer. Amorphous or semicrystalline polymers typically exhibit either only a glass transition temperature (abbreviated herein as "Tg") alone or a glass transition temperature in addition to a melting point (abbreviated herein as "Tm"), as measured by well-known techniques such as, for example, differential scanning calorimetry ("DSC"). The desired crystallization kinetics from the melt also may be achieved by the addition of polymeric additives such as, for example, plasticizers, or by altering the molecular weight characteristics of the polymer.

The crystallization half-time of the polyester, as used herein, may be measured using methods well-known to persons of skill in the art. For example, the crystallization half-time may be measured using a Perkin-Elmer Model DSC-2 differential scanning calorimeter. The crystallization half-time is measured from the molten state using the following procedure: a 15.0 mg sample of the polyester is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The isothermal crystallization temperature is the temperature between the glass transition temperature and the melting temperature that gives the highest rate of crystallization. The isothermal crystallization temperature is described, for example, in Elias, H. *Macromolecules, Plenum Press: NY,* 1977, p 391. The crystallization half-time is determined as the time span from reaching the isothermal crystallization temperature to the point of a crystallization peak on the DSC curve.

The diacid residues of the polyester preferably comprise at least 80 mole percent (mole %), based on the total moles of diacid residues, of one or more residues of terephthalic acid, naphthalenedicarboxylic acid, 1,4-cyclohexanedicarboxylic acid, or isophthalic acid. Any of the various isomers of naphthalenedicarboxylic acid or mixtures of isomers may be used, but the 1,4-, 1,5-, 2,6-, and 2,7-isomers are preferred. Cycloaliphatic dicarboxylic acids such as, for example, 1,4-cyclohexanedicarboxylic acid may be present at the pure cis or trans isomer or as a mixture of cis and trans isomers. For example, the polyester may comprise about 80 to about 100 mole % of diacid residues from terephthalic acid and 0 to about 20 mole % diacid residues from isophthalic acid.

The polyester also contains diol residues that may comprise about 10 to about 100 mole % of the residues of 1,4-cyclohexanedimethanol and 0 to about 90 mole % of the residues of one or more other diols containing 2 to about 20 carbon atoms. As used herein, the term "diol" is synonymous with the term "glycol" and means any dihydric alcohol. For example, the diol residues may comprise about 10 to about 100 mole percent, based on the total moles of diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol. Examples of suitable polyalkylene glycols include polyethylene glycol, polypropylene glycol, polybutylene glycol, and the like. Further examples of diols that may be used in the polyesters of our invention are triethylene glycol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,5-pentanediol; thiodiethanol; 1,2-cyclohexanedimethanol; 1,3-cyclohexanedimethanol; p-xylylenediol; bisphenol S; or combinations of two or more of these glycols. The cycloaliphatic diols, for example, 1,3- and 1,4-cyclohexanedimethanol, may be present as their pure cis or trans isomers or as a mixture of cis and trans isomers. In another example, the diol residues may comprise about 10 to about 100 mole percent of the residues of 1,4-cyclohexanedimethanol and 0 to about 90 mole % of the residues of ethylene glycol. In a further example, the diol residues may comprise about 20 to about 80 mole percent of the residues of 1,4-cyclohexanedimethanol and about 20 to about 80 mole percent of the residues of ethylene glycol. In another example, the diol residues may comprise about 20 to about 70 mole percent of the residues of 1,4-cyclohexanedimethanol and about 80 to about 30 mole percent of the residues of ethylene glycol. In yet another example, the diol residues may comprise about 20 to about 65 mole percent of the residues of 1,4-cyclohexanedimethanol and the diacid residues about 95 to about 100 mole percent of the residues of terephthalic acid.

The polyester may further comprise from 0 to about 20 mole percent of the residues of one or more modifying diacids containing about 4 to about 40 carbon atoms. Examples of modifying dicarboxylic acids that may be used include aliphatic dicarboxylic acids, alicyclic dicarboxylic acids, aromatic dicarboxylic acids, or mixtures of two or more of these acids. Specific examples of modifying dicarboxylic acids include, but are not limited to, one or more of succinic acid, glutaric acid, adipic acid, suberic acid, sebacic acid, azelaic acid, dimer acid, or sulfoisophthalic acid. Additional examples of modifying diacarboxylic acids are fumaric; maleic; itaconic; 1,3-cyclohexanedicarboxylic; diglycolic; 2,5-norbornanedicarboxylic; phthalic; diphenic; 4,4'-oxydibenzoic; and 4,4'-sulfonyldibenzoic.

The polyester may comprise about 0.05 to about 1 weight percent (wt %), based on the total weight of the polyester, of one or more residues of a branching monomer having 3 or more carboxyl substituents, hydroxyl substituents, or a combination thereof. Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. Preferably, the branching monomer residues comprise about 0.1 to about 0.7 weight percent of one or more residues of trimellitic anhydride, pyromellitic dianhydride, glycerol, sorbitol, 1,2,6-hexanetriol, pentaerythritol, trimethylolethane, or trimesic acid. The branching monomer may be added to the polyester reaction mixture or blended with the polyester in the form of a concentrate as described, for example, in U.S. Pat. No. 5,654,347.

The polyesters of the present invention can have an inherent viscosity of about 0.5 to about 1.2 dL/g and, preferably, about 0.55 to about 0.85 dL/g. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. Other examples of I.V. values which may be exhibited by the polyester blends are about 0.55 to about 0.70 dL/g, about 0.55 to about 0.65 dL/g, and about 0.60 to about 0.65 dL/g.

In addition to the polyester, the polyester blend of the instant invention comprises a polyester elastomer. The term "polyester elastomer", as used herein, is understood to mean any polyester having a modulus of about 1 to 500 megapascals (MPa) (at room temperature). Typically, polyesters in this modulus range easily undergo deformation and exhibit reversible elongations under small applied stresses, i.e., elasticity. By the term "reversible", as used herein, it is meant that the polyester returns to its original shape after elongation. The polyester elastomer of the present invention can comprise (i) diacid residues comprising the residues of one or more diacids selected from the group consisting of substituted or unsubstituted, linear or branched aliphatic dicarboxylic acids containing 2 to 20 carbon atoms, substituted or unsubstituted, linear or branched cycloaliphatic dicarboxylic acids containing 5 to 20 carbon atoms, and substituted or unsubstituted aromatic dicarboxylic acids containing 6 to 20 carbon atoms; and (ii) diol residues comprising the residues of one or more substituted or unsubstituted, linear or branched, diols selected from the group consisting of aliphatic diols containing 2 to 20 carbon atoms, poly(oxyalkylene)-glycols and copoly(oxyalkylene)glycols of molecular weight of about 400 to about 12000, cycloaliphatic diols containing 5 to 20 carbon atoms, and aromatic diols containing 6 to 20 carbon atoms. In contrast to the various embodiments of the polyesters of the instant invention described hereinabove as random copolymers, the polyester elastomers of the invention may be random copolymers or block copolymers.

As noted above, the polyester elastomer may comprise the residues of one or more aliphatic, cycloaliphatic, and/or aromatic dicarboxylic acids. For example, the polyester elastomer may comprise the residues of at least one diacid selected from the group consisting of 1,4-cyclohexanedicarboxylic acid; 1,3-cyclohexanedicarboxylic acid; terephthalic acid; isophthalic acid; sodiosulfoisophthalic acid; adipic acid; glutaric acid; succinic acid; azelaic acid; dimer acid; and 2,6-naphthalenedicarboxylic acid. Representative aliphatic acids include 1,4-cyclohexanedicarboxylic acid, sebacic acid, dimer acid, glutaric acid, azelaic acid and adipic acid. Cycloaliphatic dicarboxylic acids such as, for example, 1,4-cyclohexanedicarboxylic acid may be present at the pure cis or trans isomer or as a mixture of cis and trans isomers. Representative aromatic dicarboxylic acids include terephthalic, phthalic and isophthalic acids, sodiosulfoisophthalic, and 2,6-naphthalenedicarboxylic acid.

The polyester elastomer also comprises the residues of at least one diol selected from the group consisting of ethylene glycol; 1,3-propanediol; 1,4butanediol; 1,5-pentanediol; 2-methylpropanediol; 2,2-dimethylpropanediol; 1,6-hexanediol; decanediol; 2,2,4,4-tetramethyl-1,3-cyclobutanediol; 1,3-cyclohexanedimethanol; 1,4-cyclohexanedimethanol; poly(ethylene ether)glycol; poly(propylene ether)glycol; and poly(tetramethylene ether) glycol. In one example, the polyester elastomer comprises a poly(oxyalkylene) glycols such as, for example, a poly(tetramethylene ether) glycol having a molecular weight of about 500-2000 and an oxygen to carbon ratio of 1:2 to 1:4. Examples of commercially available polyester elastomers which may be used in the polyester blend of the present invention include ECDEL® polyester elastomer (available from Eastman Chemical Company) and HYTREL® polyester elastomer (available from DuPont Company).

In addition, the poly(ether ester) elastomers may have incorporated therein one or more lactones or polylactones. Lactones suitable herein are widely available commercially, e.g., Union Carbide Corporation and Aldrich Chemicals. While epsilon caprolactone is especially preferred, it is also possible to use substituted lactones wherein the lactone is substituted by a lower alkyl group such as a methyl or ethyl group at the alpha, beta, gamma, delta, or epsilon positions. Additionally, it is possible to use polylactone, including homopolymers and copolymers thereof with one or more components, as well as hydroxy terminated polylactone, as block units in these poly(ether esters).

The polyester elastomer may comprise about 0.05 to about 1 weight percent (wt %), based on the total weight of the polyester elastomer, of one or more residues of a branching agent having 3 or more carboxyl substituents, hydroxyl substituents, or a combination thereof. Examples of branching agents include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. Other examples of branching agent levels within the polyester elastomer are about 0.1 to about 0.9 weight percent and 0.1 to about 0.7 weight percent.

In a further embodiment of the invention, the polyester elastomer comprises at least 90 mole %, based on the total moles of diacid residues, of the residues of at least one diacid selected from the group consisting of 1,4-cyclohexanedicarboxylic acid and terephthalic acid; about 2 to about 20 mole %, based on the total diol residues, of a poly(tetramethylene ether) glycol having a molecular weight of about 500-2000 and an oxygen to carbon ratio of 1:2 to 1:4, and about 98 to about 80 mole %, based on the total diol residues, of the residues of at least one diol selected from the group consisting of 1,4-cyclohexanedimethanol and 1,4-butanediol; and about 0.1 to about 2 mole %, based on the total diacid residues, of the residues of at least one branching agent selected from the group consisting of trimellitic acid, trimellitic anhydride, and pyromellitic dianhydride. In yet another example, the polyester elastomer comprises at least 95 mole %, based on the total moles of diacid residues, of the residues of 1,4-cyclohexanedicarboxylic acid; and about 98 to about 80 mole %, based on the total diol residues, of the residues of 1,4-cyclohexanedimethanol.

The polyester elastomer also may comprise an aliphatic-aromatic polyester (abbreviated herein as "MPE"). The AAPE may be a linear, random polyester or a branched and/or chain-extended polyester comprising diol residues which contain the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms. The substituted diols, typically, will contain 1 to about 4 substituents independently selected from halo, $C_6$-$C_{10}$ aryl, and $C_1$-$C_4$ alkoxy. Examples of diols which may be used include, but are not limited to, ethylene glycol, diethylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol with the preferred diols comprising one or more diols selected from 1,4-butanediol; 1,3-propanediol; ethylene glycol; 1,6-hexanediol; diethylene glycol; and 1,4-cyclohexanedimethanol.

The AAPE also may comprise diacid residues which contain about 35 to about 99 mole %, based on the total moles of diacid residues, of the residues of one or more substituted or unsubstituted, linear or branched, non-aromatic dicarboxylic acids selected from aliphatic dicarboxylic acids containing 2 to about 12 carbon atoms and cycloaliphatic dicarboxylic acids containing about 5 to about 10 carbon atoms. The substituted non-aromatic dicarboxylic acids will typically contain 1 to about 4 substituents selected from halo, $C_6$-$C_{10}$ aryl, and $C_1$-$C_4$ alkoxy. Non-limiting examples of aliphatic and cycloaliphatic dicarboxylic acids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. In addition to the non-aromatic dicarboxylic acids, the MPE comprises about 1 to about 65 mole %, based on the total moles of diacid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, $C_6$-$C_{10}$ aryl, and $C_1$-$C_4$ alkoxy. Non-limiting examples of aromatic dicarboxylic acids which may be used in the AAPE of our invention are terephthalic acid, isophthalic acid, and 2,6-naphthalene-dicarboxylic acid.

In one embodiment, the AAPE comprises diol residues comprising the residues of one or more of 1,4-butanediol; 1,3-propanediol; ethylene glycol; 1,6-hexanediol; diethylene glycol; or 1,4-cyclohexanedimethanol; and diacid residues comprising (i) about 35 to about 95 mole %, based on the total moles of acid residues, of the residues of one or more non-aromatic dicarboxylic acids selected from glutaric acid, diglycolic acid, succinic acid, 1,4-cyclohexanedicarboxylic acid, and adipic acid; and (ii) about 5 to about 65 mole %, based on the total moles of acid residues, of the residues of one or more aromatic dicarboxylic acids selected from terephthalic acid and isophthalic acid. More preferably, the non-aromatic dicarboxylic acid will comprise adipic acid, the aromatic dicarboxylic acid will comprise terephthalic acid, and the diol will comprise 1,4-butanediol.

Other examples of the MPE's of the present invention are those prepared from the following diols and dicarboxylic acids (or copolyester-forming equivalents thereof such as diesters) in the following mole percent, based on 100 mole percent of a diacid component and 100 mole percent of a diol component:

(1) glutaric acid (about 30 to about 75%); terephthalic acid (about 25 to about 70%); 1,4-butanediol (about 90 to 100%); and modifying diol (0 about 10%);
(2) succinic acid (about 30 to about 95%); terephthalic acid (about 5 to about 70%); 1,4-butanediol (about 90 to 100%); and modifying diol (0 to about 10%); and
(3) adipic acid (about 30 to about 75%); terephthalic acid (about 25 to about 70%); 1,4-butanediol (about 90 to 100%); and modifying diol (0 to about 10%).

The modifying diol preferably is selected from 1,4-cyclohexanedimethanol, triethylene glycol, polyethylene glycol, and neopentyl glycol. The preferred AAPEs are linear, branched or chain extended copolyesters comprising about 50 to about 60 mole percent adipic acid residues, about 40 to about 50 mole percent terephthalic acid residues, and at least 95 mole percent 1,4-butanediol residues. Even more preferably, the adipic acid residues are from about 55 to about 60 mole percent, the terephthalic acid residues are from about 40 to about 45 mole percent, and the 1,4-butanediol residues are from about 95 to 100 mole percent. Such polymers are commercially available under the trademark ECOFLEX® polyester, available from BASF Corporation.

Additional, specific examples of preferred AAPE's include a poly(tetramethylene glutarate-co-terephthalate) containing (a) 50 mole percent glutaric acid residues, 50 mole percent terephthalic acid residues and 100 mole percent 1,4-butanediol residues, (b) 60 mole percent glutaric acid residues, 40 mole percent terephthalic acid residues and 100 mole percent 1,4-butanediol residues or (c) 40 mole percent glutaric acid residues, 60 mole percent terephthalic acid residues and 100 mole percent 1,4-butanediol residues; a poly(tetramethylene succinate-co-terephthalate) containing (a) 85 mole percent succinic acid residues, 15 mole percent terephthalic acid residues and 100 mole percent 1,4-butanediol residues or (b) 70 mole percent succinic acid residues, 30 mole percent terephthalic acid residues and 100 mole percent 1,4-butanediol residues; a poly(ethylene succinate-co-terephthalate) containing 70 mole percent succinic acid residues, 30 mole percent terephthalic acid residues and 100 mole percent ethylene glycol residues; and a poly(tetramethylene adipate-co-terephthalate) containing (a) 85 mole percent adipic acid residues, 15 mole percent terephthalic acid residues and 100 mole percent 1,4-butanediol residues or (b) 55 mole percent adipic acid residues, 45 mole percent terephthalic acid residues and 100 mole percent 1,4-butanediol residues.

The polyester blend preferably comprises about 5 to about 99 weight percent polyester and about 1 to about 95 weight percent polyester elastomer. Other representative examples of blends include 5 weight percent polyester, 95 weight percent polyester elastomer; 10 weight percent polyester, 90 weight percent polyester elastomer; 20 weight percent polyester, 80 weight percent polyester elastomer; 30 weight percent polyester, 70 weight percent polyester elastomer; 40 weight percent polyester, 60 weight percent polyester elastomer; 50 weight percent polyester, 50 weight percent polyester elastomer; 60 weight percent polyester, 40 weight percent polyester elastomer; 70 weight percent polyester, 30 weight percent polyester elastomer; 80 weight percent polyester, 20 weight percent polyester elastomer; 90 weight percent polyester, 10 weight percent polyester elastomer; and 95 weight percent polyester, 5 weight percent polyester elastomer.

The polyester blend described above may comprise a release additive in an amount effective to prevent sticking of the polyester blend to the calendering rolls. The release additive can help the polyester blend pass freely between the calendering rolls without wrapping itself around the rolls or producing an excessive layer of polyester blend on the surface of the rolls. The amount of additive used in the polyester blend is typically about 0.1 to about 10 wt %, based on the total weight percent of the polyester blend. The optimum amount of release additive used is determined by factors well known in the art and is dependent upon variations in equipment, material, process conditions, and film thickness. Additional examples of release additive levels are about 0.1 to about 5 wt % and about 0.1 to about 2 wt %. Examples of release additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another release additive that may be used comprises (i) a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms have a lower molecular weight and, thus, become miscible with the polyester. Such miscible additives have less interfacial migration surface qualities resulting in poor release or an increase in haze. In another example, the ratio of the fatty acid or salt of the fatty acid to the ester wax is 2:1 or greater.

The fatty acid may comprise montanic acid in which the salt of the fatty acid may comprise one or more of the sodium salt of montanic acid, the calcium salt of montanic acid, or the lithium salt of montanic acid. The fatty acid residue of the ester wax may comprise montanic acid. The alcohol residue of the ester wax preferably contains 2 to 28 carbon atoms. Examples of alcohols include montanyl alcohol, ethylene glycol, butylene glycol, glycerol, and pentaerythritol. The additive may also comprise an ester wax which has been partially saponified with a base such as, for example, calcium hydroxide.

The polyesters and the polyester elastomers of the instant invention are readily prepared from the appropriate dicarboxylic acids, esters, anhydrides, or salts, the appropriate diol or diol mixtures, and optional branching monomers using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous," it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters of the present invention can be prepared by procedures known to persons skilled in the art. The reaction of the diol, dicarboxylic acid, and optional branching monomer components may be carried out using conventional polyester polymerization conditions. For example, when preparing the polyester by an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components and the optional branching monomer component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more typically ranging from about 220° C. to about 270° C. This low molecular weight polymer may then be polymerized by a polycondensation reaction.

The polyester blend of the invention may also comprise a plasticizer. The presence of the plasticizer is useful to enhance flexibility and the good mechanical properties of the calendered film or sheet. The plasticizer also helps to lower the processing temperature of the polyester and may help to prevent sticking of the polyester blend to the calender rolls. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. More preferably, the plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers and their solubilities as determined by the above test are set forth in Table 1. A value of 4 or greater over the range of temperatures tested indicates that the plasticizer is a candidate for use in the present invention.

TABLE 1

Solubilities of Plasticizers

| | TEMPERATURE (° C.) | | | | | |
|---|---|---|---|---|---|---|
| | 23 | 75 | 100 | 140 | 150 | 160 |
| Adipic Acid Derivatives | | | | | | |
| Dicapryl adipate | 1 | 1 | 1 | 1 | 2 | 2 |
| Di-(2-ethylhexyl adipate) | 1 | 1 | 1 | 1 | 2 | 2 |
| Di(n-heptyl, n-nonyl) adipate | 1 | 1 | 1 | 1 | 2 | 2 |
| Diisobutyl adipate | 1 | 3 | 3 | 3 | 3 | 4 |
| Diisodecyl adipate | 1 | 1 | 1 | 1 | 1 | 1 |
| Dinonyl adipate | 1 | 1 | 1 | 1 | 1 | 2 |
| Di-(tridecyl) adipate | 1 | 1 | 1 | 1 | 1 | 1 |
| Azelaic Acid Derivatives | | | | | | |
| Di-(2-ethylhexyl azelate) | 1 | 1 | 1 | 1 | 2 | 2 |
| Diisodecyl azelate | 1 | 1 | 1 | 1 | 1 | 1 |
| Diisoctyl azealate | 1 | 1 | 1 | 1 | 2 | 2 |
| Dimethyl azelate | 3 | 4 | 4 | 4 | 4 | 6 |
| Di-n-hexyl azelate | 1 | 1 | 2 | 2 | 3 | 3 |
| Benzoic Acid Derivatives | | | | | | |
| Diethylene glycol dibenzoate (DEGDB) | 4 | 4 | 4 | 6 | 6 | 6 |
| Dipropylene glycol dibenzoate | 3 | 3 | 4 | 4 | 4 | 6 |
| Propylene glycol dibenzoate | 1 | 3 | 4 | 6 | 6 | 6 |
| Polyethylene glycol 200 dibenzoate | 4 | 4 | 4 | 4 | 6 | 6 |
| Neopentyl glycol dibenzoate | 0 | 3 | 3 | 3 | 4 | 6 |
| Citric Acid Derivatives | | | | | | |
| Acetyl tri-n-butyl citrate | 1 | 1 | 1 | 2 | 3 | 3 |
| Acetyl triethyl citrate | 1 | 2 | 2 | 2 | 3 | 3 |
| Tri-n-Butyl citrate | 1 | 2 | 3 | 3 | 3 | 3 |
| Triethyl citrate | 3 | 3 | 3 | 3 | 3 | 3 |
| Dimer Acid Derivatives | | | | | | |
| Bis-(2-hydroxyethyl dimerate) | 1 | 1 | 1 | 1 | 2 | 3 |
| Epoxy Derivatives | | | | | | |
| Epoxidized linseed oil | 1 | 2 | 2 | 2 | 3 | 3 |
| Epoxidized soy bean oil | 1 | 1 | 1 | 1 | 1 | 2 |
| 2-Ethylhexyl epoxytallate | 1 | 1 | 1 | 1 | 3 | 3 |

TABLE 1-continued

Solubilities of Plasticizers

| | TEMPERATURE (° C.) | | | | | |
|---|---|---|---|---|---|---|
| | 23 | 75 | 100 | 140 | 150 | 160 |
| Fumaric Acid Derivatives | | | | | | |
| Dibutyl fumarate | 2 | 2 | 3 | 3 | 3 | 3 |
| Glycerol Derivatives | | | | | | |
| Glycerol Tribenzoate | 0 | 0 | 6 | 6 | 6 | 6 |
| Glycerol triacetate | 2 | 3 | 3 | 3 | 3 | 4 |
| Glycerol diacetate monolaurate | 1 | 2 | 2 | 2 | 2 | 4 |
| Isobutyrate Derivative | | | | | | |
| 2,2,4-Trimethyl-1,3-pentanediol, Diisobutyrate | 1 | 1 | 1 | 1 | 3 | 3 |
| Texanol diisobutyrate | 1 | 2 | 2 | 2 | 2 | 4 |
| Isophthalic Acid Derivatives | | | | | | |
| Dimethyl isophthalate | 0 | 5 | 5 | 6 | 6 | 6 |
| Diphenyl isophthalate | 0 | 0 | 0 | 0 | 0 | 0 |
| Di-n-butylphthalate | 2 | 3 | 3 | 3 | 3 | 3 |
| Lauric Acid Derivatives | | | | | | |
| Methyl laurate | 1 | 2 | 3 | 3 | 3 | 3 |
| Linoleic Acid Derivative | | | | | | |
| Methyl linoleate, 75% | 1 | 1 | 2 | 3 | 3 | 3 |
| Maleic Acid Derivatives | | | | | | |
| Di-(2-ethylhexyl) maleate | 1 | 1 | 2 | 3 | 3 | 3 |
| Di-n-butyl maleate | 2 | 3 | 3 | 3 | 3 | 3 |
| Mellitates | | | | | | |
| Tricapryl trimellitate | 1 | 1 | 1 | 1 | 1 | 1 |
| Triisodecyl trimellitate | 1 | 1 | 1 | 1 | 1 | 1 |
| Tri-(n-octyl,n-decyl) trimellitate | 1 | 1 | 1 | 1 | 1 | 1 |
| Triisonyl trimellitate | 1 | 1 | 1 | 1 | 1 | 1 |
| Myristic Acid Derivatives | | | | | | |
| Isopropyl myristate | 1 | 1 | 1 | 2 | 3 | 3 |
| Oleic Acid Derivatives | | | | | | |
| Butyl oleate | 1 | 1 | 1 | 2 | 3 | 3 |
| Glycerol monooleate | 0 | 1 | 1 | 1 | 3 | 3 |
| Glycerol trioleate | 1 | 1 | 1 | 1 | 2 | 2 |
| Methyl oleate | 1 | 1 | 2 | 2 | 3 | 3 |
| n-Propyl oleate | 1 | 1 | 1 | 2 | 3 | 3 |
| Tetrahydrofurfuryl oleate | 1 | 1 | 1 | 2 | 3 | 3 |
| Palmitic Acid Derivatives | | | | | | |
| Isopropyl palmitate | 1 | 1 | 1 | 1 | 2 | 3 |
| Methyl palmitate | 0 | 1 | 1 | 2 | 3 | 3 |
| Paraffin Derivatives | | | | | | |
| Chloroparaffin, 41% Cl | 1 | 1 | 2 | 2 | 2 | 3 |
| Chloroparaffin, 50% Cl | 1 | 2 | 3 | 3 | 3 | 3 |
| Chloroparaffin, 60% Cl | 1 | 5 | 6 | 6 | 6 | 6 |
| Chloroparaffin, 70% Cl | 0 | 0 | 0 | 0 | 0 | 0 |
| Phosphoric Acid Derivatives | | | | | | |
| 2-Ethylhexyl diphenyl phosphate | 2 | 3 | 3 | 3 | 4 | 4 |
| Isodecyl diphenyl phosphate | 1 | 2 | 3 | 3 | 3 | 3 |
| t-Butylphenyl diphenyl phosphate | 1 | 3 | 3 | 4 | 6 | 6 |
| Resorcinol bis(diphenyl phosphate) (RDP) 100% RDP | 1 | 1 | 1 | 3 | 3 | 3 |
| Blend of 75% RDP, 25% DEGDB (by wt) | 1 | 2 | 2 | 4 | 4 | 5 |
| Blend of 50% RDP, 50% DEGDB (by wt) | 1 | 2 | 5 | 6 | 6 | 6 |
| Blend of 25% RDP, 75% DEGDB (by wt) | 1 | 3 | 3 | 6 | 6 | 6 |
| Tri-butoxyethyl phosphate | 1 | 2 | 3 | 4 | 4 | 4 |
| Tributyl phosphate | 2 | 3 | 3 | 3 | 3 | 3 |
| Tricresyl phosphate | 1 | 3 | 3 | 4 | 6 | 6 |
| Triphenyl phosphate | 0 | 4 | 4 | 6 | 6 | 6 |
| Phthalic Acid Derivatives | | | | | | |
| Butyl benzyl phthalate | 2 | 3 | 3 | 6 | 6 | 6 |
| Texanol benzyl phthalate | 2 | 2 | 2 | 2 | 2 | 4 |
| Butyl octyl phthalate | 1 | 1 | 2 | 2 | 3 | 3 |
| Dicapryl phthalate | 1 | 1 | 1 | 1 | 2 | 2 |
| Dicyclohexyl phthalate | 0 | 1 | 2 | 2 | 4 | 5 |
| Di-(2-ethylhexyl) phthalate | 1 | 1 | 1 | 2 | 3 | 3 |
| Diethyl phthalate | 4 | 4 | 4 | 6 | 6 | 6 |
| Dihexyl phthalate | 1 | 2 | 3 | 3 | 3 | 3 |
| Diisobutyl phthalate | 1 | 3 | 3 | 3 | 3 | 5 |
| Diisodecyl phthalate | 1 | 1 | 1 | 1 | 2 | 2 |
| Diisoheptyl phthalate | 1 | 1 | 2 | 3 | 3 | 3 |
| Diisononyl phthalate | 1 | 1 | 1 | 1 | 2 | 3 |
| Diisooctyl phthalate | 1 | 1 | 2 | 2 | 3 | 3 |
| Dimethyl phthalate | 1 | 5 | 6 | 6 | 6 | 6 |
| Ditridecyl phthalate | 1 | 1 | 1 | 1 | 2 | 3 |
| Diundecyl phthalate | 1 | 1 | 1 | 2 | 2 | 2 |
| Ricinoleic Acid Derivatives | | | | | | |
| Butyl ricinoleate | 1 | 1 | 2 | 3 | 3 | 3 |
| Glycerol tri(acetyl) ricinlloeate | 1 | 1 | 1 | 2 | 1 | 1 |
| Methyl acetyl ricinlloeate | 1 | 1 | 2 | 3 | 3 | 3 |
| Methyl ricinlloeate | 1 | 2 | 3 | 3 | 3 | 4 |
| n-Butyl acetyl ricinlloeate | 1 | 1 | 1 | 2 | 3 | 3 |
| Propylene glycol ricinlloeate | 1 | 1 | 3 | 3 | 4 | 4 |
| Sebacic Acid Derivatives | | | | | | |
| Dibutyl sebacate | 1 | 2 | 3 | 3 | 3 | 3 |
| Di-(2-ethylhexyl) sebacate | 1 | 1 | 1 | 2 | 2 | 3 |
| Dimethyl sebacate | 0 | 4 | 4 | 6 | 6 | 6 |
| Stearic Acid Derivatives | | | | | | |
| Ethylene glycol monostearate | 0 | 1 | 2 | 3 | 3 | 3 |
| Glycerol monostearate | 0 | 0 | 1 | 2 | 2 | 2 |
| Isopropyl isostearate | 3 | 3 | 3 | 6 | 6 | 6 |
| Methyl stearate | 0 | 1 | 2 | 2 | 2 | 3 |
| n-Butyl stearate | 1 | 1 | 2 | 3 | 3 | 3 |
| Propylene glycol monostearate | 0 | 1 | 1 | 2 | 2 | 3 |
| Succinic Acid Derivatives | | | | | | |
| Diethyl succinate | 3 | 3 | 4 | 5 | 6 | 6 |
| Sulfonic Acid Derivatives | | | | | | |
| N-Ethyl o,p-toluenesulfonamide | 2 | 5 | 6 | 6 | 6 | 6 |
| o,p-toluenesulfonamide | 0 | 0 | 0 | 6 | 6 | 6 |

Key:
0 = Plasticizer is a solid at this temperature
1 = Plasticizer is liquid, yet nothing happening to the film
2 = film has begun to haze
3 = film has swollen
4 = film has begun to change as disintegrating off and/or liquid becoming hazy
5 = no longer a film, liquid is hazy
6 = liquid is clear A similar test to that above is described in *The Technology of Plasticizers*, by J. Kern Sears and Joseph R. Darby, published by Society of Plastic Engineers/Wiley and Sons, New York, 1982, pp 136-137. In this test, a grain of the polymer is placed in a drop of plasticizer on a heated microscope stage. If the polymer disappears, then it is solubilized. The plasticizers that are most effective at solubilizing the polyester of the instant invention have a solubility of greater than 4 according to Table 1 and can also be classified according to their solubility parameter. The solubility parameter, or square root of the cohesive energy density, of a plasticizer can be calculated by the method described by Coleman et al., *Polymer* 31, 1187 (1990). The most preferred plasticizers will have a solubility parameter ($\delta$) in the range of about 9.5 to about 13.0 $cal^{0.5}$ $cm^{-1.5}$. It is generally understood that the solubility parameter of the plasticizer should be within 1.5 units of the solubility parameter of polyester. The data of Table 2 shows that plasticizers with a solubility parameter within this range solubilize the polyester while those plasticizers with a solubility parameter outside of this range are less effective.

TABLE 2

| Plasticizer | $\delta$ (cal$^{0.5}$ cm$^{-1.5}$) | Solubility @ 160° C. from Table 1 |
| --- | --- | --- |
| Glycerol diacetate monolaurate | 8.1 | 4 |
| Texanol diisobutyrate | 8.4 | 4 |
| Di-2-ethylhexyladipate | 8.5 | 2 |
| Trioctyltrimellitate | 8.8 | 1 |
| Di-2-ethylhexylphthalate | 8.9 | 2 |
| Texanol benzyl phthalate | 9.5 | 4 |
| Neopentyl glycol dibenzoate | 9.8 | 6 |
| Dipropylene glycol dibenzoate | 10.0 | 6 |
| Butyl benzyl phthalate | 10.1 | 6 |
| Propylene glycol dibenzoate | 10.3 | 6 |
| Diethylene glycol dibenzoate | 10.3 | 6 |
| Glycerol tribenzoate | 10.6 | 6 |

In general, higher molecular weight plasticizers are preferred to prevent smoking and loss of plasticizer during the calendering process. The preferred range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polyester blend that may be calendered satisfactorily also decreases. Typically, the polyester blend comprises from about 5 to about 50 weight percent (wt %) of the plasticizer based on the total weight of the polyester blend. Other examples of plasticizer levels are about 10 to about 40 wt %, about 15 to about 40 wt %, and about 15 to about 30 wt % of the polyester blend.

Examples of plasticizers which may be used according to the invention are esters comprising (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB".

The polyester blend also may comprise a phosphorus-containing flame retardant. The phosphorus-containing flame retardant should be miscible with the polyester or the plasticized polyester. The term "miscible", as used herein, is understood to mean that the flame retardant and the plasticized polyester will mix together to form a stable mixture that will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. Preferably, the phosphorus-containing compound is a non-halogenated, organic compound such as, for example, a phosphorus acid ester containing organic substituents. The flame retardant may comprise a wide range of phosphorus compounds well-known in the art such as, for example, phosphines, phosphites, phosphinites, phosphonites, phosphinates, phosphonates, phosphine oxides, and phosphates. Examples of phosphorus-containing flame retardants include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to, dibenzyl phosphoric acid, dibutyl phosphoric acid, di(2-ethylhexyl) phosphoric acid, diphenyl phosphoric acid, methyl phenyl phosphoric acid, phenyl benzyl phosphoric acid, hexylphosphonic acid, phenylphosphonic acid tolylphosphonic acid, benzylphosphonic acid, 2-phenylethylphosphonic acid, methylhexyl-phosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more monoesters, diesters, or triesters of phosphoric acid. In another example, the flame retardant comprises resorcinol bis(diphenyl phosphate), abbreviated herein as "RDP".

The flame retardant may be added to the polyester blend at a concentration of about 5 wt % to about 40 wt % based on the total weight of the polyester blend. Other examples of the flame retardant levels are about 7 wt % to about 35 wt %, about 10 wt % to about 30 wt %, and about 10 wt % to about 25 wt %. The phosphorus-containing flame retardant may also function as a plasticizer for the polyester. In this embodiment, the flame retardant may be substituted for a portion or all of the plasticizer component of the polyester blend, depending on the flame retardant's effectiveness as a plasticizer. Typically, when a plasticizing flame retardant is used, the amount of flame retardant needed to achieve the desired burn rate or flame resistance of the calendered film or sheet is determined first, then the amount of plasticizer needed to produce the desired Tg of the film or sheet is adjusted.

Oxidative stabilizers also may be used with polyesters of the present invention to prevent oxidative degradation during processing of the molten or semi-molten material on the rolls. Such stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus-containing stabilizers such as IRGAFOS® available from Ciba-Geigy AG and WESTON® stabilizers available from GE Specialty Chemicals. These stabilizers may be used alone or in combinations.

It is also possible to use agents such as sulfoisophthalic acid to increase the melt strength of the polyester blends to a desirable level. In addition, the polyester blends may contain dyes, pigments, fillers, matting agents, antiblocking agents, antistatic agents, blowing agents, chopped fibers, glass, impact modifiers, carbon black, talc, TiO$_2$ and the like as desired. Colorants, sometimes referred to as toners, may be added to impart a desired neutral hue and/or brightness to the polyester blend and the calendered product.

The various components of the polyester blends such as, for example, the flame retardant, release additive, plasticizer, and toners, may be blended in batch, semicontinuous, or continuous processes. Small scale batches may be readily prepared in any high-intensity mixing devices well-known to those skilled in the art, such as Banbury mixers, prior to calendering. The components also may be blended in solution in an appropriate solvent. The melt blending method includes blending the polyester, plasticizer, flame retardant, additive, and any additional non-polymerized components at a temperature sufficient to melt the polyester. The blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the polyester mixture during the reaction of the diol and the dicarboxylic acid or they may be melt blended with the preformed polyester. A preferred method of including colorants is to use a colorant having thermally stable organic colored compounds having reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after an ester interchange or direct esterification reaction.

In another embodiment, the invention provides a polyester blend comprising:

(a) about 5 to about 95 weight percent, based on the total weight of the blend, of a polyester having a crystallization half-time from a molten state of at least 5 minutes in which the polyester is a random copolymer comprising:
  (i) diacid residues comprising at least 80 mole percent, based on the total moles of diacid residues, of one or more residues of terephthalic acid, naphthalenedicarboxylic acid, 1,4-cyclohexane-dicarboxylic acid, or isophthalic acid; and
  (ii) diol residues comprising about 10 to about 100 mole percent, based on the total moles of diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and (b) about 5 to about 95 weight percent, based on the total weight of the blend, of one or more polyester elastomers comprising:
  (i) diacid residues comprising the residues of one or more diacids selected from the group consisting of substituted or unsubstituted, linear or branched aliphatic dicarboxylic acids containing 2 to 20 carbon atoms, substituted or unsubstituted, linear or branched cycloaliphatic dicarboxylic acids containing 5 to 20 carbon atoms, and substituted or unsubstituted aromatic dicarboxylic acids containing 6 to 20 carbon atoms; and
  (ii) diol residues comprising the residues of one or more substituted or unsubstituted, linear or branched, diols selected from the group consisting of aliphatic diols containing 2 to 20 carbon atoms, poly(oxyalkylene)-glycols and copoly(oxyalkylene)glycols of molecular weight of about 400 to about 12000, cycloaliphatic diols containing 5 to 20 carbon atoms, and aromatic diols containing 6 to 20 carbon atoms; and (c) optionally, a release additive in an amount effective to prevent sticking of the polyester blend to calendering rolls.

In yet another embodiment, the invention provides a polyester blend comprising:

(a) a polyester, wherein the polyester is a random copolymer having a crystallization half-time from a molten state of at least 5 minutes;
(b) one or more polyester elastomers comprising:
  (i) diacid residues comprising the residues of one or more substituted or unsubstituted cycloaliphatic dicarboxylic acids containing 5 to 20 carbon atoms; and
  (ii) diol residues comprising the residues of one or more substituted or unsubstituted, linear or branched, diols selected from the group consisting of aliphatic diols containing 2 to 20 carbon atoms, poly(oxyalkylene)-glycols and copoly(oxyalkylene)glycols of molecular weight of about 400 to about 12000, cycloaliphatic diols containing 5 to 20 carbon atoms, and aromatic diols containing 6 to 20 carbon atoms; and
(c) optionally, a release additive in an amount effective to prevent sticking of the polyester blend to calendering rolls.

The blends may comprise branching monomers, flame retardants, and plasticizers and the like as described hereinabove.

The invention also provides a process for making a film or sheet comprising extruding or calendering the polyester blends of the invention. Conventional calendering or extrusion equipment using methods known to persons skilled in the art may be used to prepare the film and sheet of our invention.

The process of the invention may be further illustrated and described with particular reference to calendering processes. Conventional calendering processes and equipment may be used to calender the polyester blends of the invention. In the process of the invention, the polyester composition may be in a molten, pellet, or powder form and is passed through a compressive nip between at least two calendering rolls at temperatures of about 100° C. to about 200° C. Typically, the polyester blend is mixed with the plasticizer, flame retardants, additive, and other components. The mixed ingredients are plasticized in a kneader or extruder. Through heat, shearing, and pressure, the dry powders are fused to form a homogeneous, molten material. The extruder feeds the molten material in a continuous process to the top of the calendering section of the calendering line in between first and second heated calender rolls. Typically, four rolls are used to form three nips or gaps. For example, the rolls may be configured in an "L" shape, an inverted "L" shape", or a "Z" configuration. The rolls vary in size to accommodate different film widths. The rolls have separate temperature and speed controls. The material proceeds through the nip between the first two rolls, referred to as the feed nip. The rolls rotate in opposite directions to help spread the material across the width of the rolls. The material winds between the first and second, second and third, third and fourth rolls, etc. The gap between rolls decreases in thickness between each of the rolls such that the material is thinned between the sets of rolls as it proceeds. The resulting film or sheet, therefore, has a uniform thickness that is produced by passing the polyester composition through the compressive nips between the heated rolls. In effect, the polyester composition is squeezed between the nips which separate the rolls. Each successive nip between the calendering rolls reduces the film thickness until the final film or sheet gauge is obtained.

In one embodiment of our invention, the polyester blend comprises a polyester having an inherent viscosity of about 0.55 to about 0.85 dL/g and about 0.05 to about 1 weight percent branching monomer, based on the total weight of the polyester. This range of inherent viscosity (abbreviated hereinafter as "I.V.") in combination with a branching agent can impart a higher melt strength and a higher degree of shear thinning, which allows our novel polyester blends to be calendered at lower temperatures, at high line speeds, and without excessive drawdown of the resulting film or sheet. Other examples of I.V. values which may be exhibited by the polyester are about 0.55 to about 0.70 dug, about 0.55 to about 0.65 dL/g, and about 0.60 to about 0.65 dL/g.

Typical processing temperatures for the rolls will generally range from about 80° C. to about 220° C., preferably about 100° C. to about 200° C., and more preferably about 130° C. to about 180° C. For some hydrolytically unstable polyesters, predrying the polyester resin blend or venting excess moisture during processing is desirable to prevent polymer degradation by hydrolysis. After passing through the calender section, the material moves through another series of rolls where it is stretched and gradually cooled forming a film or sheet. The material also may be embossed or annealed before cooling. The cooled material is then wound onto master rolls. General descriptions of calendering processes are disclosed in Jim Butschli, *Packaging World*, p. 26-28, June 1997 and W. V. Titow, *PVC Technology*, 4th Edition, pp 803-848 (1984), Elsevier Publishing Co.

Extrusion processes are well known for the production of film, sheet and profile products. For film and sheet production using an extrusion process, a twin-screw or single-screw process may be employed. For the purposes of this invention, both twin-screw and single-screw extrusion processes are viable. An extruder also may be used to feed the front end of a calendering process. In this embodiment, the extruder may be a single-screw extruder, twin-screw extruder, a planetary extruder, or a co-kneader. In an extrusion process for film and sheet, a molten polymer blend is delivered to a slit die on the end of the extruder and the molten material is then exuded to a cast roll to be cooled and polished. Typical extrusion processes for polyesters run about 20° C. to 80° C. hotter than comparable calendering processes.

Our invention thus further provides a film or sheet, prepared by an extrusion or calendering process, comprising the polymer blends described herein. The film or sheet may further encompass the various embodiments, concentration ranges, and combinations of polyesters, polyester elastomers, diols, diacids, branching monomers, release additives, flame retardants and plasticizers, modifying diacids, described herein for the polyester blends, calendering, and extrusion processes of the instant invention. The invention is further illustrated and described by the following examples.

EXAMPLES

Polyester Compositions

Amorphous copolyesters A, B, C, and D and polyester elastomers E and F were used to prepare the polyester blends used in Examples 1-7. The composition of these polyesters and polyester elastomers are listed in Table 3 below.

TABLE 3

| Composition | Diacid Component | Diol Component | Crystallization Half-Time |
|---|---|---|---|
| Polyester A | 100 mole % terephthalic acid (TA) | 31 mole % cyclohexane dimethanol (CHDM) and 69 mole % ethylene glycol (EG) | 2500 minutes |
| Polyester B | 100 mole % TA | 62 mole % CHDM and 38 mole % EG | 30 minutes |
| Polyester C | 100 mole % TA | 71 mole % EG, 20 mole % CHDM, and 9 mole % diethylene glycol | 169 minutes |
| Polyester D | 99.8 mole % TA and 0.195 wt % trimellitic anhydride (TMA) | 69 mole % EG and 31 mole % CHDM | >5 minutes |
| Polyester Elastomer E | 43 mole % TA and 57 mole % adipic acid | 100 mole % 1,4-butanediol | n/a |
| Polyester Elastomer F | 99.5 mole % trans-1,4, cyclohexane dicarboxylic acid and 0.5 mole % TMA | 91.1 mole % CHDM and 8.9 mole % polytetramethylene ether glycol with an average MW of 1000 | n/a |

Test Procedures

1. Bend Crease

Films produced in Examples 1-5 were subject to the following bend crease testing procedure.

Cut a film of 5 inches in length and at least ½" in width. Bring the two ends together bending the middle of the film length in such a way as to form a 180° alteration from the original film form. Crease the bend by applying a sliding pressure along the bend with a pen or similar instrument. Observe the outer radius for whitening. Now open the crease back until the film is "open" and flatten the crease open. Observe the film for whitening and easily visible fracture.

2. Tensile Stress

Films produced in Examples 6-7 were subject to the following tensile stress procedure.

Cut films 1 inch in width by 5 inches in length. Stretch the film by applying constant pressure and strain in opposite directions of the center point. The speed of stretch should be at 2" per minute constant from start. Observe alteration in clarity/haze level from original.

A decrease in clarity, hence, increase in haze, is evidence of stress whitening. Lack of alteration in clarity/haze qualifies the film as non-whitening.

An extension of this procedure is to add colorants or fillers, many of which will exacerbate the formation of stress and voiding that leads to a designation of stress whitened. If, after following the similar stretching procedure, the color is maintained and does not whiten and/or the surface of the film in the stretched area does not rupture, a designation of non-whitening is recorded.

3. Tensile and Elongation

Tensile and elongation were both conducted according to ASTM D882.

4. Tear Force and Average Tear Resistance

Tear force and average tear resistance were both conducted according to ASTM D1938.

5. Gloss@60°

This test was conducted according to ASTM D523.

6. Instrumented Impact

This test was conducted according to ASTM D3763.

Example 1

The following films were prepared by melt blending and calendering polyester A with polyester elastomer F on a Dr. Collin two-roll mill at temperatures between 170° C. and 180° C. Each blend contained 0.75 wt % of a released additive wax (a 1:1 blend, by weight, of LICOWAX® S montanic acid (available from Clariant Corporation) and LICOWAX® OP (a butylene glycol ester of montanic acid that has been partially saponified with calcium hydroxide, available from Clariant Corporation) to prevent sticking to the two-roll mill. The resulting film samples were tested for whitening by visual inspection after the material was creased. The results are shown in Table 4 below.

TABLE 4

| Polyester A (wt %) | Polyester Elastomer F (wt %) | Whitening |
|---|---|---|
| 99 | 1 | Yes |
| 97.5 | 2.5 | Yes |
| 95 | 5 | Yes |
| 90 | 10 | Yes |
| 80 | 20 | No |
| 70 | 30 | No |
| 60 | 40 | No |
| 50 | 50 | No |

TABLE 4-continued

| Polyester A (wt %) | Polyester Elastomer F (wt %) | Whitening |
|---|---|---|
| 40 | 60 | No |
| 30 | 70 | No |

Example 2

Polyester B (90 wt %) above was melt blended and calendered with polyester elastomer F (10 wt %) and about 0.9 wt % of a release additive wax (LICOMONT® ET-132, available from Clariant Corporation) on a Dr. Collin two-roll mill at 195° C. No whitening was observed for a film formed from this blend after the film was creased.

Example 3

A series of blends containing polyester C, polyester elastomer F (1 wt %, 5 wt %, 10 wt %, 20 wt %, 30 wt %, 40 wt %, and 50 wt %), and 0.2 wt % of a release additive wax (LICOMONT® ET-132), were prepared and calendered on a Dr. Collin two-roll mill at temperatures between 175° C. and 190° C. Films formed from all blend formulations containing greater than 5 wt % polyester elastomer F did not show whitening after the material was creased.

Example 4

Polyester A above was melt blended and calendered on a Dr. Collin two-roll mill at 170° C. with polyester elastomer E (5 wt %, 10 wt % and 20 wt %) with 0.75 wt % release additive wax (a 1:1 blend, by weight, of LICOWAX® S montanic acid (available from Clariant Corporation) and LICOWAX® OP (a butylene glycol ester of montanic acid that has been partially saponified with calcium hydroxide, available from Clariant Corporation)) and about 5 wt % carbon black. No evidence of whitening was seen in any film formed from these formulations after the film was creased.

Example 5

Polyester A was melt blended with 0 wt %, 10 wt %, 20 wt %, and 30 wt % of polyester elastomer F and 1 wt % carbon black, and the resulting blend extruded at a temperature between 249° C. and 257° C. (480 to 495° F.) to form a film with a nominal thickness of 10 mils (254 µm).

Samples of the films were aged in a dry oven for 140 hours at 100° C. and their physical properties compared with samples of unaged film. Physical data for aged and unaged films are given in Tables 5-8 below.

No whitening was observed in the films of these blends or in the film of the control (0 wt % polyester elastomer F) after the films were laminated, using an acrylic adhesive, to a 2 inch×4 inch×⅛ inch thick aluminum plate and creased by bending the plate at a 180 degree angle. The "unaged" control and experimental blend films showed good strength and toughness. After "aging" at 100° C. for 140 hours, the control film lost impact properties and exhibited increased brittleness. However, the "aged" blend film samples showed good heat resistance, strength, and toughness. The "aged" 20% and higher blends of polyester elastomer F retained their ductile nature even at an impact temperature of 0° C.

TABLE 5

PHYSICAL PROPERTIES
UNAGED 10-MIL (254μ) "BLACK" FILMS

| TEST | UNITS | Polyester A CONTROL | Polyester A + 10% Polyester Elastomer F | Polyester A + 20% F | Polyester A + 30% F |
|---|---|---|---|---|---|
| TENSILE @ YD | MPa | 46 | 43 | 40 | 37 |
| TENSILE @ BRK | MPa | 55 | 49 | 49 | 49 |
| ELONG. @ YD | % | 4.3 | 4.3 | 4.3 | 4.2 |
| ELONG. @ BRK | % | 435 | NA | 437 | 460 |
| TEAR FORCE | N | 11.5 | 9.7 | 6.9 | 5.7 |
| AVG. TEAR RESIST. | N/mm | 44 | 35.6 | 24.4 | 21.4 |
| GLOSS @ 60° | UNITS | 102 | 99 | 98 | 88 |

TABLE 6

PHYSICAL PROPERTIES
AGED 140 HRS @ 100° C., 10-MIL (254μ) "BLACK" FILMS

| TEST | UNITS | Polyester A CONTROL | Polyester A + 10% F | Polyester A + 20% F | Polyester A + 30% F |
|---|---|---|---|---|---|
| TENSILE @ YD | MPa | 49 | 46 | 42 | 38 |
| TENSILE @ BRK | MPa | 48 | 34 | 50 | 49 |
| ELONG. @ YD | % | 5 | 4.7 | 4.6 | 4.6 |
| ELONG. @ BRK | % | 182 | 257 | 430 | 451 |
| TEAR FORCE | N | 9.6 | 8.1 | 5.7 | 5.8 |
| AVG. TEAR RESIST. | N/mm | 38 | 30 | 20 | 22 |
| GLOSS @ 60° | UNITS | NA | 56 | 75 | 52 |

TABLE 7

IMPACT PROPERTIES
UNAGED 10-MIL (254μ) "BLACK" FILMS

| TEST METHOD & CONDITIONS[1,2] | UNITS | Polyester A CONTROL | Polyester A + 10% F | Polyester A + 20% F | Polyester A + 30% F |
|---|---|---|---|---|---|
| INSTR. IMPACT @ 23° C. | J | 1.90/2.33 | 2.32/2.65 | 2.17/2.50 | 1.90/2.31 |
| D/B | — | 100/0 | 100/0 | 100/0 | 100/0 |
| INSTR. IMPACT @ 0° C. | J | 1.76/2.32 | 1.91/2.69 | 1.47/2.55 | 1.85/2.70 |
| D/B | — | 40/60 | 80/20 | 100/0 | 100/0 |
| INSTR. IMPACT @ −40° C. | J | 1.48/1.65 | 1.58/1.75 | 1.61/1.96 | 1.29/1.54 |
| D/B | — | 0/100 | 0/100 | 0/100 | 0/100 |

[1] The Instrumented Impact values are reported as "Energy @ Maximum Load/Total Energy" in the table.
[2] "D/B" is the ratio of Ductile Failure/Brittle Failure.

TABLE 8

IMPACT PROPERTIES
AGED 140 HRS @ 100° C., 10-MIL (254μ) "BLACK" FILMS

| TEST METHOD & CONDITIONS[1,2] | UNITS | Polyester A CONTROL | Polyester A + 10% F | Polyester A + 20% F | Polyester A + 30% F |
|---|---|---|---|---|---|
| INSTR. IMPACT @ 23° C. | J | 1.19/2.48 | 2.11/3.65 | 1.84/2.39 | 1.54/2.51 |
| D/B | — | 0/100 | 100/0 | 80/20 | 100/0 |
| INSTR. IMPACT @ 0° C. | J | 1.19/2.90 | 1.69/2.59 | 2.49/3.60 | 2.33/2.57 |
| D/B | — | 0/100 | 0/100 | 100/0 | 100/0 |

TABLE 8-continued

IMPACT PROPERTIES
AGED 140 HRS @ 100° C., 10-MIL (254μ) "BLACK" FILMS

| TEST METHOD & CONDITIONS[1,2] | UNITS | Polyester A CONTROL | Polyester A + 10% F | Polyester A + 20% F | Polyester A + 30% F |
|---|---|---|---|---|---|
| INSTR. IMPACT @ −40° C. | J | 1.01/1.04 | .95/1.84 | 1.84/2.06 | 1.89/2.12 |
| D/B | — | 0/100 | 0/100 | 0/100 | 0/100 |

[1]The Instrumented Impact values are reported as "Energy @ Maximum Load/Total Energy" in the table.
[2]"D/B" is the ratio of Ductile Failure/Brittle Failure.

Example 6

Polyester D with 0.75 wt % release agent wax (a 1:1 blend, by weight, of LICOWAX® S montanic acid (available from Clariant Corporation) and LICOWAX® OP (a butylene glycol ester of montanic acid that has been partially saponified with calcium hydroxide, available from Clariant Corporation)) and a stress additive at levels listed in Table 9 were compounded on a Dr. Collin instrumented two-roll mill with the roll set point temperature at 165 to 170° C., roll rpm of 20 with differential front to rear set at 10%, and a gap setting of 0.20 mm. Upon completion of melt formation and establishment of even polymer bank distribution and rotation, a film was removed at 5 rpm. These films were allowed to "age" for at least 24 hours before tensile stress evaluations were conducted. The results are shown in Table 9. "Yes" in the table means that visible whitening or surface rupture was observed, and "No" means that no whitening or surface rupture was observed in the film.

TABLE 9

| | Additive Concentration | | | | |
|---|---|---|---|---|---|
| Additive | 5 wt % | 10 wt % | 15 wt % | 20 wt % | 25 wt % |
| Ecdel 9966 | Yes | Yes | No | No | No |
| DEG ECDEL | Yes | Yes | Yes | No | Not tested |
| EMAC 2202 | No | Yes | Yes | Yes | Yes |
| Ecoflex 7011 | Yes | No | No | No | No |
| Hytrel 4056 | Yes | No | No | No | No |
| KaneAce B564 | Yes | Yes | Yes | Yes | No |
| Kaneda M300 | Yes | Yes | Yes | Yes | Yes |

Example 7

Example 6 was repeated with some of the stress additives and with 1 wt % carbon black added as a colorant to the polyester blends. The stress additives, their concentrations, the results of tensile stress evaluations are shown in Table 10. "Yes" in the table means that visible whitening or surface rupture was observed, and "No" means that no whitening or surface rupture was observed in the film.

TABLE 10

| | Additive Concentration | | | |
|---|---|---|---|---|
| Additive | 5 wt % | 10 wt % | 15 wt % | 20 wt % |
| Ecdel 9966 | Broke | Yes | Yes | No |
| DEG ECDEL | Broke | Yes | Yes | No |

TABLE 10-continued

| | Additive Concentration | | | |
|---|---|---|---|---|
| Additive | 5 wt % | 10 wt % | 15 wt % | 20 wt % |
| Ecoflex 7011 | Broke | Yes | Yes | Yes |
| Hytrel 4056 | Broke | No | No | No |
| KaneAce B564 | Broke | Yes | Yes | Yes |

The invention has been described in detail with particular reference to preferred embodiments thereof, but it will be understood that variations and modifications can be effected within the spirit and scope of the invention.

We claim:

1. A polyester blend comprising:
   (a) a polyester, wherein said polyester is a random copolymer having a crystallization half-time from a molten state of at least 5 minutes; and
   (b) one or more polyester elastomers comprising:
      (i) diacid residues comprising the residues of one or more substituted or unsubstituted cycloaliphatic dicarboxylic acids containing 5 to 20 carbon atoms; and
      (ii) diol residues comprising the residues of one or more substituted or unsubstituted, linear or branched, diols selected from the group consisting of aliphatic diols containing 2 to 20 carbon atoms, poly(oxyalkylene)-glycols and copoly(oxyalkylene)glycols of molecular weight of about 400 to about 12000, cycloaliphatic diols containing 5 to 20 carbon atoms, and aromatic diols containing 6 to 20 carbon atoms.

2. The polyester blend according to claim 1, which further comprises a release additive in an amount effective to prevent sticking of said polyester blend to calendering rolls.

3. The polyester blend according to claim 2, wherein the release additive is selected from the group consisting of erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, and glycerol distearate.

4. The polyester blend according to claim 2, wherein the release additive comprises (i) a fatty acid or salt thereof containing more than 18 carbon atoms and (ii) an ester wax comprising a fatty acid residue containing more than 18 carbon atoms and an alcohol residue containing from 2 to about 28 carbon atoms.

5. The polyester blend according to claim 1, which further comprises one or more additives selected from the group consisting of plasticizers, flame retardants, antioxidants, antiblocking agents, fillers, colorants, and pigments.

6. The polyester blend according to claim 1, wherein the polyester further comprises one or more modifying acids selected from the group consisting of succinic acid, glutaric acid, adipic acid, suberic acid, sebacic acid, azelaic acid, dimer acid, and sulfoisophthalic acid.

7. The polyester blend according to claim 1, wherein the polyester further comprises about 0.05 to about 1 weight percent, based on the total weight of the polyester, of one or more residues of a branching monomer selected from the group consisting of trimellitic acid, trimellitic anhydride, pyromellitic dianhydride, trimethylolpropane, glycerol, pentaerythritol, citric acid, tartaric acid, 3-hydroxyglutaric acid.

8. The polyester blend according to claim 1, wherein the polyester elastomer comprises residues of at least one diacid selected from the group consisting of 1,4-cyclohexanedicarboxylic acid and 1,3-cyclohexanedicarboxylic acid.

9. The polyester blend according to claim 1, wherein the polyester elastomer comprises residues of at least one diol selected from the group consisting of ethylene glycol, 1,3-propanediol, 1,4-butanediol, 1,5-pentanediol, 2-methylpropanediol, 2,2-dimethylpropanediol, 1,6-hexanediol, decanediol, 2,2,4,4-tetramethyl-1,3-cyclobutanediol, 1,3-cyclohexanedimethanol, 1,4-cyclohexanedimethanol, poly(ethylene ether)glycol, poly(propylene ether)glycol, and poly(tetramethylene ether) glycol.

10. The polyester blend according to claim 9, wherein the polyester elastomer further comprises about 0.05 to about 1 weight percent, based on the total weight of the polyester elastomer, of one or more residues of a branching monomer selected from the group consisting of trimellitic acid, trimellitic anhydride, pyromellitic dianhydride, trimethylolpropane, glycerol, pentaerythritol, citric acid, tartaric acid, 3-hydroxyglutaric acid.

11. The polyester blend according to claim 1, wherein the polyester elastomer comprises:
(a) diacid residues comprising
(i) at least 90 mole %, based on the total moles of diacid residues, of the residues of 1,4-cyclohexanedicarboxylic acid; and
(ii) about 0.1 to about 2 mole %, based on the total diacid residues, of the residues of at least one branching agent selected from the group consisting of trimellitic acid, trimellitic anhydride, and pyromellitic dianhydride; and
(b) diol residues comprising
(i) about 2 to about 20 mole %, based on the total diol residues, of a poly(tetramethylene ether) glycol having a molecular weight of about 500-2000, and
(ii) about 98 to about 80 mole %, based on the total diol residues, of the residues of at least one diol selected from the group consisting of 1,4-cyclohexanedimethanol and 1,4-butanediol.

12. The polyester blend according to claim 1, which comprises from about 15 to about 25 weight percent of the polyester elastomer.

13. A process for making a film or sheet, comprising calendering or extruding the polyester blend according to claim 1.

14. A process for making a film or sheet, comprising calendering or extruding the polyester blend according to claim 2.

15. A film or sheet, prepared by an extrusion or calendering process, comprising the polyester blend according to claim 1.

16. A film or sheet, prepared by an extrusion or calendering process, comprising the polyester blend according to claim 2.

* * * * *